May 4, 1965
B. DEUTSCH ETAL
3,181,567
FOUR PART REVERSING VALVE
Filed April 3, 1961
2 Sheets-Sheet 1
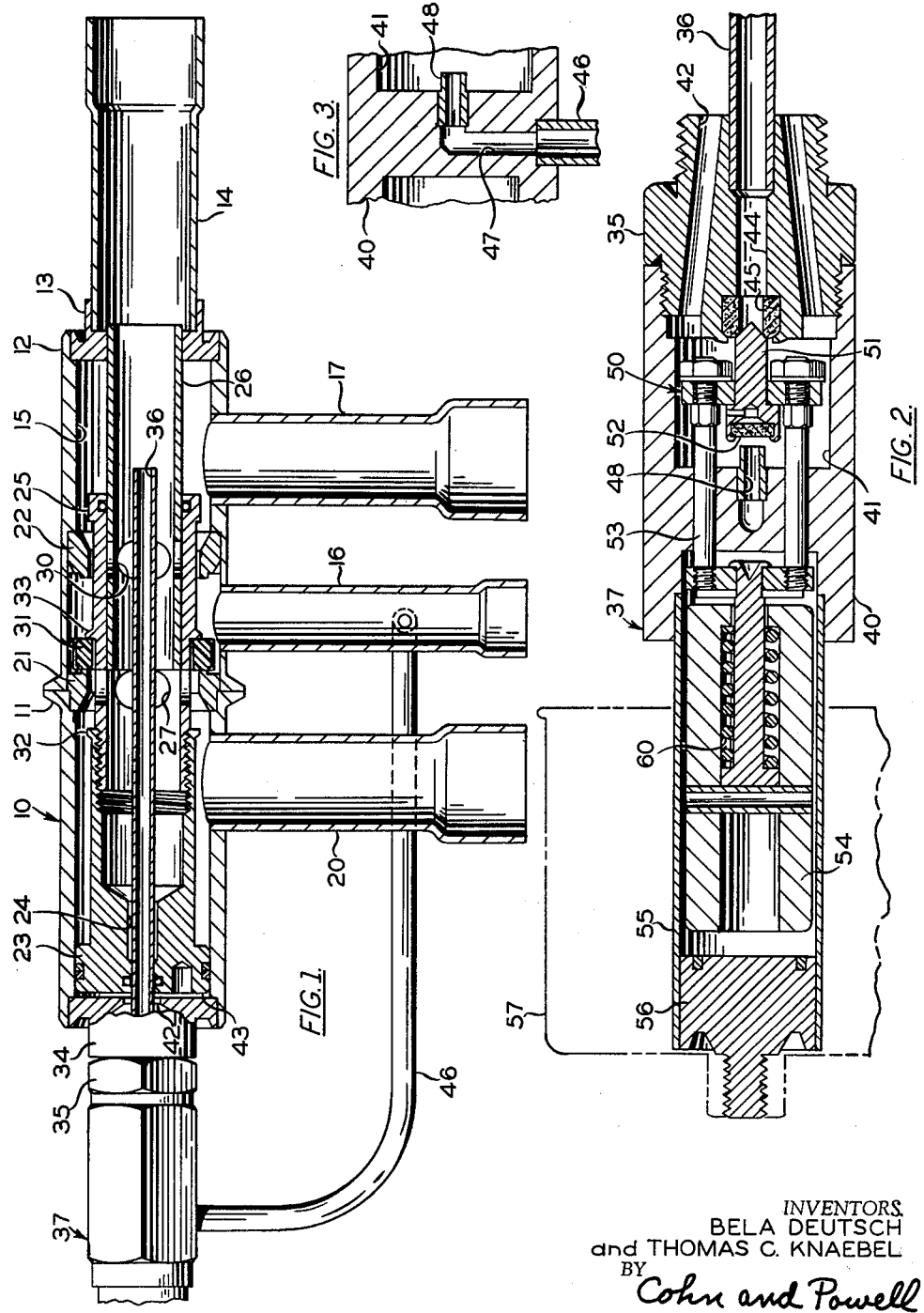
INVENTORS.
BELA DEUTSCH
and THOMAS C. KNAEBEL
BY
*Cohn and Powell*
ATTORNEY.

May 4, 1965  B. DEUTSCH ETAL  3,181,567

FOUR PART REVERSING VALVE

Filed April 3, 1961  2 Sheets-Sheet 2

INVENTORS.
BELA DEUTSCH
and THOMAS C. KNAEBEL
BY
Cohn and Powell
ATTORNEY.

United States Patent Office 3,181,567
Patented May 4, 1965

3,181,567
FOUR PORT REVERSING VALVE
Bela Deutsch, Ladue, and Thomas C. Knaebel, Kirkwood, Mo., assignors to Bela Deutsch, Herman Deutsch, and Carl J. Deutsch, doing business as Standard Machine & Manufacturing Co.
Filed Apr. 3, 1961, Ser. No. 100,399
1 Claim. (Cl. 137—625.43)

This invention relates generally to improvement in a valve apparatus, and more particularly to improvements in a four way valve in which the flow stream into and out of an inlet and outlet respectively, may be switched between first and second connections in an improved manner.

During the past decade, the principle of using the refrigeration cycle as a means of providing both heating and cooling in a single unit has aroused the interest of many manufacturers, engineers and potential users. While considerable progress has been made, one of the greatest limiting factors to the rapid development of this growing heat pump market has been the availability of a reliable and efficient automatic control through which the suction and compressor discharge gas could be shunted to or from either the indoor or outdoor coil.

It is an important object to provide an improved reversing valve that has been produced in quantity and proved by a thorough field evaluation by several of the leading heat pump manufacturers.

An important object is to achieve both dependable and efficient performance by constructing the internal valve parts so that they offer little friction in movement yet seal tightly to minimize any by-pass leakage from the high (discharge) pressure side to the low (suction) pressure side of the system.

Because metal to metal seats or sliding seals are subject to both wear and corrosion under normal operating conditions, and recognizing the fact that extraneous foreign matter can easily cause a malfunction of parts in this type of construction, these adverse conditions are avoided by advantageously utilizing synthetic materials.

Another important object is achieved by the structural arrangement and mounting of the reciprocative piston in the four way valve, and by the assembly for selectively connecting the valve chamber at one side of the piston to either the outlet through its tubular mounting or directly to the inlet, whereby to provide a more positive operation even with minimum pressure differential and to provide only a single external connection to a pilot valve coupled to the main valve body.

Still another important object is realized in a valve apparatus which has no external connection that prevents the removal and replacement of a solenoid coil on a pilot valve attached to the main valve body of the four way valve.

The present four way valve represents an improvement over prior valves of this general type disclosed in U.S. Patent No. 2,920,653, issued January 12, 1960, and in U.S. Patent No. 2,969,091, issued January 24, 1961, both entitled "Valve Apparatus."

It will be obvious to those skilled in the art that although the apparatus of this invention is particularly described for use in switching between a heating cycle and a cooling cycle in a heat pump system, and has been found especially well suited for that purpose, the scope of this invention is not restricted to such use, and other applications for such apparatus are contemplated.

Yet another important object is to provide a four way valve that is simple and durable in construction, economical to manufacture, efficient and fully automatic in operation.

The foregoing and numerous other objects and advantages of the invention will more clearly appear from the following detail description of a preferred embodiment, particularly when considered in connection with the accompanying drawings, in which:

FIG. 1 is a cross-sectional view of the four way valve as seen in a vertical plane passed along the longitudinal axis, the valve parts being conditioned for a heating cycle;

FIG. 2 is an enlarged, cross-sectional view of the pilot valve attached to one end of the main valve body of FIG. 1;

FIG. 3 is a fragmentary cross-sectional view of the external connection to the pilot valve;

Figure 4:
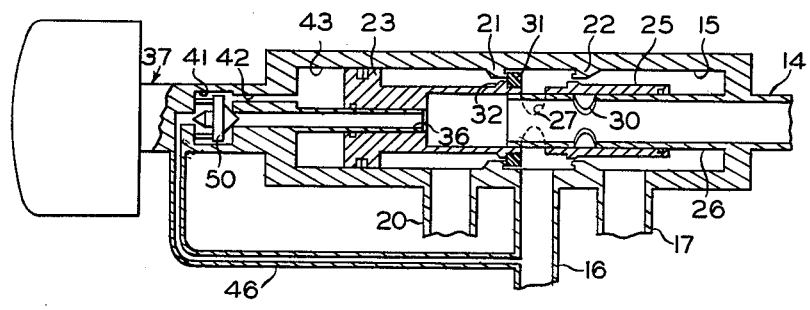
FIG. 4 is a schematic illustration of the valves shown in FIGS. 1 and 2, but showing the valve parts conditioned to reverse the system to a cooling cycle.

Referring now by characters of reference to the drawings, and first to FIG. 1, it will be seen that the four way valve apparatus includes a valve body generally indicated at 10 that is tubular and cylindrical in shape. In the embodiment disclosed, the valve body 10 consists of two parts hermetically sealed along mating annular flanges 11.

One end of valve body 10 is closed by a plug 12 that is welded to provide a hermetic seal. A collar 13 on plug 12 is adapted to retain a tubular fitting 14 constituting the outlet connection. The outlet connection 14 is adapted to be connected to the suction side of a heat pump system.

Attached to the side of valve body 10 and communicating with the chamber 15 is a compressor discharge connection 16 constituting an inlet connection.

A first connection 17 is attached to valve body 10 at one side of the inlet connection 16 and is adapted to communicate with the body chamber 15. The first connection 17 is adapted to be connected to the indoor coil of the heat pump system. A similar second connection 20 is connected to the valve body 10 at the opposite side of the inlet connection 16 and communicates with chamber 15. This second connection 20 is adapted to be connected to the outdoor coil of the heat pump system.

A pair of spaced annular valve seats 21 and 22 are fixed to the valve body internally of chamber 15, the valve seat 21 being located between the inlet connection 16 and the second connection 20 while the other valve seat 22 is located between the inlet connection 16 and the first connection 17.

Reciprocatively mounted in sealably slidable relation within body chamber 15 is a piston 23. The piston 23 is provided with a longitudinal bore 24 therethrough. A valve member including telescopically related sleeves 25 and 26 is located axially within the body chamber 15. The sleeve 25 is attached directly to the piston 23 and is movable therewith, while the sleeve 26 is connected to closure plug 12 and communicate with the suction outlet connection 14.

The sleeve 25 is provided with valve ports 27 that communicate with the body chamber 15. The sleeve 26 is provided with valve ports 30 that communicate also with the body chamber 15 under certain operating conditions.

In one position of piston 23, the sleeves 25 and 26 are relatively extended so that the valve ports 27 clear the inner end of sleeve 26 and are thereby opened to the body chamber 15. At the same time, the valve ports 30 are closed by the overlapping of the sleeve 25. In another position of sleeves 25 and 26, the valve ports 27 and 30 are aligned (FIG. 5) to place the sleeves in communication with chamber 15. The purpose and functional advantages of these valve ports 27 and 30 will become apparent upon later description of parts.

An annular sealing element or ring 31 is slidably carried on sleeve 25, the sealing element 31 being adapted to engage selectively either of the annular valve seats 21 or 22 upon reciprocation of piston 23. Furthermore, it will be noted that the sealing element 31 is slidable on sleeve 25 within a range determined by spaced abutments 32 and 33 which also constitute valve seats. When the sealing element 31 engages either of the valve seats 21 or 22 and also engages respectively either one of the sleeve abutments 32 or 33, an effective seal is provided in the chamber 15 between the valve body 10 and the sleeve 25. The sealing element 31 is preferably constructed of a plastic material such as Teflon.

Fitted and welded to the opposite end of valve body 10 to provide a hermetic seal is a closure plug 34. A fitting 35 is threaded to closure plug 34 and is thereby attached to the main valve body 10. Perhaps the construction of threaded fitting 35 is best illustrated in FIG. 2. It will be noted from FIG. 2 that a tube 36 is carried by the fitting 35. From FIG. 1, it will be noted that the tube 36 extends through the closure plug 34, through the piston bore 24 and into the interior of the telescopically related sleeves 25 and 26. The piston 23 is slidable on center tube 36, yet is sealably related. The center tube 36 communicates directly through one end with the sleeves 25 and 26, and consequently communicates directly with the outlet connection 14.

A pilot valve generally indicated at 37 includes the threaded fitting 35 and is thereby attached to the main valve body 10. In addition, the pilot valve 37 includes a casing 40 threadedly connected to the fitting 35, the casing 40 being provided with an internal compartment 41. A plurality of passages 42 formed in the fitting 35 and in the closure plug 34 place the compartment 41 in direct communciation with the pilot chamber 43 (FIG. 1) at one side of piston 23. Furthermore, the left hand end of center tube 36 communicates with compartment 41 through an internal bore 44 and tubular valve seat 45.

An external tubing 46 is attached to the inlet connection 16 and to the pilot valve casing 40. As is best seen in FIG. 3, the tubing 46 communicates with compartment 41 through a passage 47 and a tubular valve seat 48.

Reciprocatively mounted within the casing compartment 41 is a valve member generally referred to at 50 in FIG. 2. The valve member 50 includes a tapered valve portion 51 adapted selectively to interfit and seat on the valve seat 45, whereby to place the center tube 36 selectively in and out of communication with the compartment 41. In addition, the valve member 50 includes a flat disc type valve portion 52 adapted selectively to seat on the inwardly projecting end of valve seat 48, whereby to place the external tubing 46 selectively in and out of communication with the compartment 41.

A plurality of rods 53 connect the valve member 50 to a reciprocating armature 54 mounted within an elongate cylindrical casing 55 that is attached to the pilot valve casing 40. The outer end of cylindrical casing 55 is closed by a plug 56. A solenoid coil (not shown) is carried within a housing 57 shown in phantom lines in FIG. 2. The solenoid coil is disposed in position about the armature 54 and in place about the cylindrical casing 55 by attaching the housing 57 to the closure plug 56.

For a complete disclosure, it will be assumed that the four way valve is connected to a heat pump system so that the operation and functional advantages can be briefly described. First, the inlet connection 16 is operatively connected to the compressor discharge line. The outlet connection 14 is operatively connected to the suction line of the system. The first connection 17 is operatively connected to the indoor coil while the second connection 20 is operatively connected to the outdoor coil of such system.

When the solenoid coil of the three way pilot valve 37 is energized, the armature 54 is moved by the magnetic field in a direction so that the valve portion 52 of valve member 50 seats on the valve seat 48 to close the external tubing 46 from the compartment 41. Simultaneously, the valve member 50 moves away from the valve seat 45 and opens the center tube 36 to the compartment 41. The pilot chamber 43 at one side of piston 23 is thereby placed in direct communication with the suction outlet connection 14. It will be seen that the path of such communication from the outlet connection 14 is from the sleeve 26 into the end of center tube 36, through the valve seat 45 into the compartment 41, and thence through the passages 42 into the pilot chamber 43. The pressure differentials existing in the four way valve on opposite sides of the piston 23 causes the piston 23 to move to the extreme left hand position as illustrated in FIG. 1. The heat pump system is now conditioned for a heating cycle.

During the heating cycle, the sealing element 31 engages the annular valve seat 21 and is held in place by abutment 33 on piston sleeve 25. This condition closes off direct communication of the inlet connection 16 with the second connection 20 through the chamber 15. At the same time, the sleeves 25 and 26 are relatively extended so that the valve ports 27 in sleeve 25 are open to the chamber 15 at one side of the sealing element 31 to be in communication with the second connection 20.

The compressor discharge gas flows through the inlet connection 16 and into chamber 15 at one side of sealing element 31. The gas then flows through the port between valve seat 22 and sleeve 25 into the first connection 17 leading to the indoor coil. The gas from the outdoor coil passes through the second connection 20 and into the chamber 15 at the opposite side of the sealing element 31. From chamber 15, this gas is then fed into the sleeves 25 and 26 through the valve ports 27, and thence directed into the suction outlet connection 14. Again it will be noted that the pilot chamber 43 at one side of piston 23 is subjected to the suction pressure existing at the outlet connection 14 through the center tube 36.

If it is desired to convert the heat pump system from a heating cycle to a cooling cycle, the solenoid coil of the three way pilot valve 37 is de-energized. Fluid pressure in compartment 41 causes the armature 54 and pilot valve member 50 to move in a direction so that the valve portion 51 of valve member 50 seats on the valve seat 45 and closes the center tube 36.

Simultaneously, the disc type valve portion 52 of valve member 50 unseats from the valve seat 48 and opens the compartment 41 to the external tubing 46. This position of the pilot valve 37 is illustrated in FIG. 2.

Figure 5:
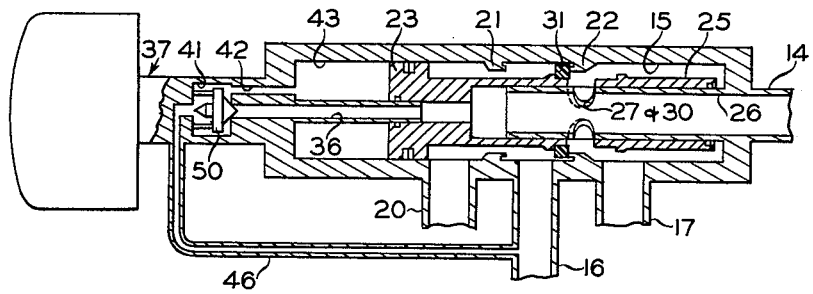
FIG. 5 is a schematic illustration similar to FIG. 4, but showing the valve parts conditioned for a cooling cycle.

From FIG. 4, it is seen that the pilot chamber 43 at one side of the piston 23 is subjected to pressure conditions at the inlet connection 16 through passages 42, compartment 41 and external tubing 46. The pressure differential existing on opposite sides of the piston 23 now causes the piston 23 to move along the center tube 36. During this movement of piston 23, sleeves 25 and 26 telescope so that sleeve 26 closes the valve ports 27 in sleeve 25. The sealing element 31 remains seated against the valve seat 21 during this shifting movement of piston 23, the sealing element 31 sliding on the periphery of sleeve 25 along the longitudinal axis. When the sleeve abutment 32 engages the sealing element 31, it then carries the sealing element 31 with piston 23 into abutment with the other annular valve seat 22 located between inlet connection 16 and the first connection 17 as is illustrated in FIG. 5. The heat pump system is now conditioned for a cooling cycle.

As is best seen in FIG. 5, during the cooling cycle, the sealing element 31 engaging the annular seat valve 22 closes communication of the inlet connection 16 with the first connection 17 through the chamber 15. However, it will be noted that the inlet connection 16 is in direct communication with the second connection 20 leading to the outdoor coil through the annular valve port provided between the sleeve 25 and the valve seat 21. When the piston 23 is fully shifted to the position of FIG. 5, the valve ports 27 and 30 are aligned so that the interior of sleeves 25 and 26 is placed in direct communication with chamber 15 at one side of the sealing element 31, and hence in direct communication with the first connection 17 leading to the indoor coil.

When the heat pump system is conditioned for the cooling cycle, the compressor discharge gas flows from the inlet connection 16 into the valve chamber 15 at one side of sealing element 31, and hence flows into the second connection 20 leading to the outdoor coil. The gas from the indoor coil is directed by the first connection 17 into chamber 15 at the other side of the sealing element 31, and thence is directed into the sleeves 25 and 26 through the aligned ports 27 and 30. The gas is then fed into the suction outlet connection 14.

Figure 6:
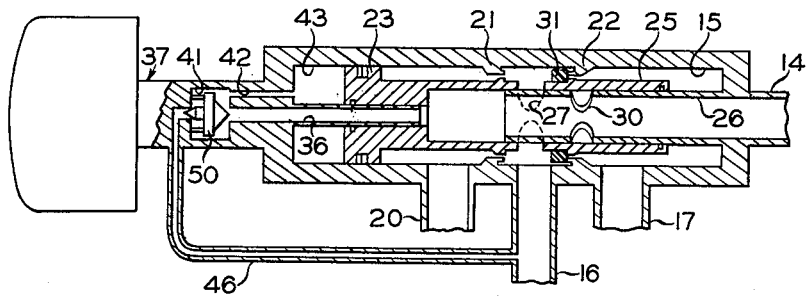
FIG. 6 is a schematic illustration similar to FIGS. 4 and 5, but showing the valve parts conditioned for reversing the system to a heating cycle.

If it is desired to convert the heat pump system back to the heating cycle, the solenoid coil of the pilot valve 37 is again energized. As is seen in FIG. 6, the valve member 50 moves to close the external tubing 46 and to open the center tube 36. The pilot chamber 43 at one side of piston 23 is now subjected to pressure existing at the suction outlet connection 14. The path of communication is from the suction outlet connection, the sleeves 25 and 26, center tube 36, compartment 41, passage 42 and then pilot chamber 43. The pressure differential existing on piston 23 causes the piston 23 to move back along the center tube 36, and causes an extension of the telescoped sleeves 25 and 26.

During the initial movement of piston 23, the sealing element 31 remains in contact with the annular valve seat 22 by sliding along the longitudinal axis and on the periphery of sleeve 25. As the sleeves 25 and 26 are relatively extended, the valve ports 27 and 30 are closed.

Upon continued movement of piston 23 toward the one end of chamber 15, the sleeve abutment 33 engages the sealing element 31 and moves the sealing element 31 toward the other annular valve seat 21 located between the inlet connection 16 and the second connection 20. The component parts of the four way valve apparatus are now disposed in their initial positions illustrated in FIG. 1. The heat pump system is then conditioned again for the heating cycle.

Although the improvements have been described by making detailed reference to a single preferred embodiment, such detail is to be understood in an instructive, rather than in any restrictive sense, many variants being possible within the scope of the claim hereunto appended.

We claim as our invention:

A four way valve comprising a valve body having a chamber therein, a piston sealably slidable within the chamber, an inlet to and an outlet from said chamber at one side of said piston, first and second connections communicating with said chamber at the same side of said piston, a valve seat on the body within the chamber between the inlet and each of the first and second connections, an annular sealing element carried by the piston, abutments on the piston between which the sealing element slides, said piston having a bore therethrough, an internal tube supported by the body and extending through the piston bore in substantial sealing relation, said piston being slidable on said internal tube, a first sleeve connected to said piston, said tube having one end disposed in and communicating with the interior of said first sleeve, a second sleeve extending from said outlet into said chamber, said sleeves being telescopically related and having ports therein, said one end of the tube communicating directly with only the outlet and not the inlet of said chamber, the body being provided with a compartment, a partition between said chamber and compartment, the opposite end of said tube communicating with said compartment through said partition, a passage through said partition communicating said compartment with the chamber at the other side of said piston, an external line interconnecting the inlet directly to said compartment, and a pilot valve including a reciprocating valve element alternately connecting the passage with either the last said tube end or the external line, said piston and said first sleeve being movable between a first position in which the sealing element seats on the valve seat between the inlet and the second connection to direct flow from the inlet into said first connection and opening one of said ports to communicate with the chamber at the other side of the valve seat between the inlet and second connection for directing flow from the second connection into the outlet, and a second position in which the sealing element seats on the valve seat between the inlet and first connection to direct flow from said inlet in said second connection and aligning said ports to communicate with the chamber at the other side of the valve seat between the inlet and first connection to direct flow from the first connection into the outlet, the valve ports being closed by relative movement of the sleeves before the piston abutments engage the sealing element to move the sealing element away from one valve seat and toward the other valve seat upon movement of the piston between the first and second pistons.

References Cited by the Examiner
UNITED STATES PATENTS 2,659,197  11/53  Halford et al. _____ 251—30 X
2,969,091  1/61  Wolff _____ 137—625.43

FOREIGN PATENTS 1,110,895  10/55  France.
1,150,154  8/57  France.
  969,108  4/58  Germany.

MARTIN P. SCHWADRON, *Acting Primary Examiner.*

WILLIAM F. O'DEA, MILTON KAUFMAN, LAVERNE D. GEIGER, *Examiners.*